United States Patent [19]

Katchman et al.

[11] 4,128,602

[45] Dec. 5, 1978

[54] POLYPHENYLENE ETHER COMPOSITIONS CONTAINING RUBBER MODIFIED POLYSTYRENE

[75] Inventors: Arthur Katchman, Delmar; Gim F. Lee, Jr., Albany, both of N.Y.

[73] Assignee: General Electric Company, Pittsfield, Mass.

[21] Appl. No.: 809,440

[22] Filed: Jun. 23, 1977

Related U.S. Application Data

[63] Continuation of Ser. No. 489,510, Jul. 18, 1974, abandoned, which is a continuation-in-part of Ser. No. 122,079, Mar. 8, 1971, abandoned, which is a continuation-in-part of Ser. No. 31,793, Apr. 24, 1970, abandoned.

[51] Int. Cl.$^2$ .............................................. C08L 51/04
[52] U.S. Cl. ........................... 260/876 R; 260/897 R; 260/897 C
[58] Field of Search ..................... 260/876 R

[56] References Cited

U.S. PATENT DOCUMENTS

| | | | |
|---|---|---|---|
| 3,383,435 | 5/1968 | Cizek | 260/874 |
| 3,487,127 | 12/1969 | Erchak et al. | 260/876 |
| 3,511,895 | 5/1970 | Kydonieus et al. | 260/880 |

FOREIGN PATENT DOCUMENTS 1013393  12/1965  United Kingdom ..................... 260/880

Primary Examiner—Carman J. Seccuro
Attorney, Agent, or Firm—Morgan, Finnegan, Pine, Foley & Lee

[57] ABSTRACT

There are provided high impact strength thermoplastic compositions comprising a polyphenylene ether and a polystyrene resin and rubber of a rubber modified polystryene resin. The compositions include a dispersed elastomeric phase with the dispersed particles having a maximum mean diameter of 2 microns and preferably from about 0.5 to 2 microns. The small elastomeric particles provide molded articles with substantial and unexpected improvements in impact resistance, surface appearance and resistance to aggressive solvent systems in comparison with known compositions having dispersed elastomeric particles of larger than 2 microns in diameter.

19 Claims, No Drawings

POLYPHENYLENE ETHER COMPOSITIONS CONTAINING RUBBER MODIFIED POLYSTYRENE

CROSS-REFERENCE TO RELATED APPLICATION

This is a continuation, of application Ser. No. 489,510 filed July 18, 1974; which is a continuation-in-part of Ser. No. 122,079, filed Mar. 8, 1971, which in turn is a continuation-in-part of Ser. No. 31,793, filed Apr. 24, 1970, now abandoned.

This invention relates to thermoplastic resin compositions and, more particularly, to high impact thermoplastic compositions comprising a polyphenylene ether and a polystyrene resin and rubber or a rubber modified polystyrene resin.

BACKGROUND OF THE INVENTION

The polyphenylene ethers are known and described in numerous publications, including Hay U.S. Pat. Nos. 3,306,874 and 3,306,875; and Stamatoff U.S. Pat. Nos. 3,257,357 and 3,257,358, all incorporated herein by reference. The high molecular weight polyphenylene ethers are high performance engineering thermoplastics having relatively high melt viscosities and softening points, i.e., in excess of 275° C. They are useful for many commercial applications requiring high temperature resistance and can be formed into films, fibers and molded articles.

While possessing the above described desirable properties it is also known that certain of the properties of the polyphenylene ethers are undesirable for some commercial uses. For example, parts molded from polyphenylene ethers are somewhat brittle due to poor impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperature needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

It is known in the art that the properties of the polyphenylene ethers can be materially altered by forming compositions with other polymers. For example, Finholt, U.S. Pat. No. 3,379,792 discloses that flow properties of polyphenylene ethers are improved by preparing a composition thereof with from about 0.1 to 25 parts by weight of a polyamide. In Gowan, U.S. Pat. Nos. 3,361,851, polyphenylene ethers are formed into compositions with polyolefins to improve impact strength and resistance to aggressive solvents. In Cizek, U.S. Pat. No. 3,383,435, incorporated herein by reference, Fox, U.S. Pat. No. 3,356,761, and Bostick et al, French Pat. No. 1,586,729, there are provided means to simultaneously improve the melt processability of the polyphenylene ethers and upgrade many properties of polystyrene resins. These patents disclose that polyphenylene ethers and vinyl materials, e.g., blended or grafted polystyrene resins, including many modified polystyrenes, are combinable in all proportions to provide compositions having many properties improved over those of either of the components. This invention provides compositions of the type disclosed broadly in such prior art, but with unexpectedly high impact strength.

Preferred embodiments of teh Cizek patent are compositions comprising a rubber modified high-impact polystyrene and a poly(2,6-dialkyl-1,4-phenylene)ether. Such compositions are important commercially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide predetermined properties ranging between those of teh polystyrene resin and those of the polyphenylene ether by controlling the ratio of the two polymers. The reason for this is that the Cizek compositions exhibit a single set of thermodynamic properties rather than the two distinct sets of properties, i.e., one for each of the components of the composition, as is typical with compositions or blends of the prior art.

The preferred embodiment of the Cizek patent is disclosed to comprise poly(2,6-dimethyl-1,4-phenylene)ether and a rubber modified high-impact polystyrene (identified in Example 7 as Lustrex HT88-1 of Monsanto Chemical Company). It is known in the art that Monsanto HT-88 high impact polystyrene contains an elastomeric gel phase dispersed through a polystyrene matrix and that the particle size of the dispersed elastomer ranges from 2 to 10 microns with an average of 4 to 6 microns. This is shown, for example, in the photomicrograph in Vol. 19, Encyclopedia of Chemical Technology, 2nd Edition, 1969, pages 94, FIG. 2(b). Thus the preferred embodiment of the Cizek patent, which was disclosed to have a notched Izod impact strength ranging from 1.05 to 1.5 ft.-lbs./in. notch (Standard Method, ASTM-D-256) comprised a polyphenylene ether and a rubber modified high-impact polystyrene resin having a dispersed elastomeric gel phase with average particle size of about 4 to 6 microns.

It is generally recognized that the properties of impact resistant polystyrene are highly dependent on the number, size and character of dispersed elastomeric particles. Moreover, there is an optimum particle size in the region of 2 to 5 or 10 microns for rubber-modified impact-resistant polystyrene with a relatively narrow size distribution within this range. See, for example, Vol. 13, Encyclopedia of Polymer Science and Technology, 1970, page 392. In Duck et al, U.K. Pat. No. 1,127,820, it is disclosed that if the elastomer is dispersed in small particles of up to 1 micron, the impact properties of the rubber modified polystyrene are poor, being little better than crystal polystyrene. It is disclosed therein that optimum diameter will be 5 to 10 microns for good impact properties commensurate with good surface gloss. In Walker et al, U.K. Pat. No. 1,174,214, it is disclosed that uniformly small elastomeric particles, for example, those having a diameter of 1-2 microns, have an adverse effect on energy absorption characteristics of rubber modified polystyrenes. Such compositions are reported to have low elongation value and a low notched Izod impact strength. Walker et al teach the need to add particles with 5 to 25 micron size to overcome the adverse effect of the small, 1 to 3 micron, particles.

In the present state of the art, therefore, compositions of polyphenylene ethers and rubber modified styrene resins are known, in which the dispersed elastomeric phase has a particle size of about 4 to 6 microns, and which have a notched Izod impact strength of from about 1.05 to 1.5 ft.-lbs/in. notch. It is also known that the optimum elastomeric particle size in rubber modified polystyrene ranges from about 2 to about 5 or 10 microns, and that if the particle size is up to 1 or from 1 to 2 microns, the impact properties are poor, and only slightly better than crystal polystyrene.

In view of the above, it has now unexpectedly been found that compositions of a polyphenylene ether with a styrene resin and a rubber or with a rubber modified polystyrene resin can be provided with substantially improved impact strengths if the dispersed elastomeric phase is maintained below an average maximum of about 2 microns. The impact strengths are substantially higher than those of comparable compositions wherein the average particle size is increased above about 2 to, for example, about 6 microns, i.e., within the range disclosed in the prior art to be optimum. In addition, the surface appearance, especially gloss, is unexpectedly improved, as is the resistance to aggressive solvents, such as gasoline.

DESCRIPTION OF THE INVENTION

According to the present invention, in its broadest aspects, there are provided thermoplastic compositions with unexpectedly high impact resistance comprising a polyphenylene ether, a polystyrene and a rubber, the composition having a dispersed particulate phase having a maximum mean particles diameter of about 2 microns, preferably from 0.5 to 2 microns. In general, the compositions according to this invention are prepared by combining said polyphenylene ether; a polystyrene, including modified polystyrenes; and a rubber to obtain a composition having at least two phases, one of which is discontinuous and comprises rubber particles having a maximum diameter of 2 microns. Such compositions may be molded to shape using conventional molding procedures. It is to be understood that the polystyrene resin and the rubber may be added to the composition with polyphenylene ether as separate components or, more preferably, the polystyrene resin and the rubber may be added combined.

Therefore, according to a preferred aspect of this invention, there are provided high impact strength thermoplastic compositions comprising a polyphenylene ether and
(a) a polystyrene resin and a rubber;
(b) a rubber modified polystyrene resin; or
(c) a mixture of (a) and (b),
the composition having a dispersed particulate elastomeric phase in which the particles have a maximum mean diameter of about 2 microns, and preferably from about 0.5 microns to about 2 microns.

The compositions generally consist of a mixture of two phases, the continuous phase being a matrix of polyphenylene oxide resin and styrene resin in which there is a discontinuous phase dispersed comprising particles of elastomer. Such particles may also include to varying extents, polystyrene resins and polyphenylene ether resins, depending upon how the compositions are prepared. In any event, the size of the particles can be measured by means well known to those skilled in the art, e.g., either by phase contrast microscopy, which is especially convenient, or by microfiltration, and similar known methods.

As has been mentioned, the polystyrene resin and the elastomer can be combined with the polyphenylene ether as separate components or, more preferably, because lower amounts of elastomer seem to provide comparable impact strengths, a rubber modified polystyrene resin can be combined with the polyphenylene ether. In the first method the particle size of the elastomeric phase is controlled, e.g., reduced, by mechanical blending of the rubber, styrene resin and polyphenylene oxide resin. In the second method, the particle size of the elastomer is provided, e.g., by polymerizing styrene in the presence of dissolved rubber under well known conditions whereby a dispersed microgel of, e.g., grated, cross-linked rubber particles becomes dispersed in a polystyrene matrix. This is then combined with the polyphenylene ether and the size of the particle remains generally the same in the final composition.

The polyphenylene ethers with which this invention is concerned are fully described in the above-mentioned references. The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula:

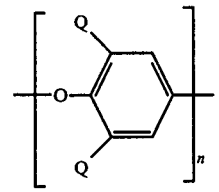

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary α-carbon atoms, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene) ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like. Examples of polyphenylene ethers corresponding to the above formula can be found in the above referenced patents of Hay and Stamatoff.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4- phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with polystyrene resins over the entire range of combining ratios.

In the present compositions, the polyphenylene ether is combined with the polystyrene and a rubber or with a rubber-modified polystyrene. The term "polystyrene" is used herein in the same manner as defined in Cizek, U.S. Pat. No. 3,383,435. Such styrene resins will be combinable with the polyphenylene ether and, in general, wil be selected from those having at least 25% by weight of the polymer units derived from a vinyl aromatic monomer, e.g., one having the formula:

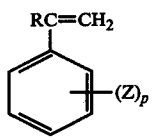

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene resins include homopolymers of polystyrene; polychlorostyrene; poly-$\alpha$-methylstyrene; and the like; styrene-containing copolymers, such as styrene-acrylonitrile copolymers; copolymers of ethylvinylbenzene and divinylbenzene; styrene-acrylonitrile-$\alpha$-methylstyrene terpolymers; and the like. Preferred polystyrene resins of this class are homopolystyrene; poly-$\alpha$-methylstyrene; styrene-acrylonitrile copolymers; styrene-$\alpha$-methylstyrene copolymer; styrene-methyl methacrylate copolymer; and poly-$\alpha$-chlorostyrene. Especially preferred is homopolystyrene.

The term "rubber" as used herein includes polymeric materials, natural and synthetic, which are elastomers at room temperatures, e.g., 20° to 25° C. The term "rubber" includes, therefore, natural or synthetic rubbers of the type generally used in preparing impact polymers. All such rubbers will form a two phase system with the resin, e.g., a polystyrene resin, and will comprise the discontinuous particulate phase in the impact resistant polystyrene resin composition. Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are neutral crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxy-terminated polybutadienes; poly-chlorobutadienes, e.g., neoprenes; polyisobutylene, and copolymers of isobutylene with butadiene or isoprene; polyisoprene; copolymers of ethylene and propylene and interpolymers thereof with butadiene; thiokol rubbers; polysulfide rubbers; acrylic rubbers; polyurethane rubbers; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; polyether rubbers; epichlorohydrin rubbers and the like. The preferred rubbers comprise polybutadiene and rubber copolymers of butadiene with styrene. Such preferred rubbers are widely used in forming rubber modified high impact polystyrene resins with the broad range of elastomeric particle sizes mentioned in the above-cited references.

The term "rubber modified polystyrene resin" defines a class of compounds comprising a two-phase system in which rubber is dispersed in a polystyrene resin matrix in the form of discrete particles. The particles can be formed by a mechanical blending of the rubber and the polystyrene resin and in this case the particles will comprise a dispersed ungelled elastomeric phase. On the other hand, and as is preferred, the two-phase system will consist of interpolymers of a styrene monomer and an elastomer or rubber. Commercially, such high impact polystyrenes are usually made by grafting of rubber in the presence of polymerizing styrene. Such systems consist of a continuous phase of the polymerized styrene monomer in which the rubber or elastomer is dispersed in a discontinuous elastomeric gel phase, with or without grafted chains of polymerized styrene monomer. The particles may contain occluded, polymerized styrene monomer, too, and this has some bearing on their size.

Methods for preparing rubber modified polystyrenes of controlled particle size are known. For example, U.K. Pat. No. 1,174,214, mentioned above, polymerization of rubber in styrene monomer is carried out in bulk and the mixture is agitated during the beginning stages to form the desired particle size and then stirring is reduced and polymerization is completed. On the other hand, in the method of Bender, J. Appl. Polymer Sci., 9, 2887 (1965), a bulk pre-polymerization of rubber in styrene monomer is carried out with agitation until the desired particle size is obtained then water and surfactants are added and polymerization is completed in suspension. In addition, as has been mentioned above, rubber and the polystyrene resin can be mechanically mixed under relatively severe shearing forces in, for example, an intensive mixer of the Banbury-type, until a rubber modified polystyrene with elastomer particles of the desired size are obtained.

The rubber modified polystyrene resins preferably comprise those in which the elastomeric phase comprises particles of polystyrene grafted elastomeric gel. Preferably such resins will contain from about 70 to 99 parts by weight of polystyrene and 1 to 30 parts by weight of particulate diene elastomer-styrene graft copolymer gel phase, having a maximum mean diameter within the range of 0.5 to 2 microns. Especially preferably, in such resins, the elastomer will be derived from butadiene, from a butadiene styrene copolymer or from a mixture thereof. Such materials can be made by well known methods, e.g., those cited above. They are also available commercially from a number of sources, e.g., Foster Grant, Inc., product designation No. 834.

As is described in Cizek, U.S. Pat. No. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% polystyrene resin, on a rubber-free basis, and these are included within the scope of the invention. In general, compositions in which the polystyrene resin, on a rubber-free basis, comprises from 20 to 80% by weight of the polystyrene and the polyphenylene ether, are preferred because after molding they have the best combination of impact strength, surface appearance and resistance to solvents. Particularly useful and preferred are compositions in which the polystyrene resin, on a rubber-free basis, comprises from 40 to 60% by weight of the combined weight of the polystyrene and the polyphenylene ethers. Properties, such as flexural strength, tensile strength, hardness and especially impact strength appear to be at a maximum in such preferred compositions.

The rubber content, i.e., the weight percentage of the dispersed elastomeric phase, in the instant compositions can vary, although no advantage is secured in exceeding a maximum of about 30% by weight of the total weight of the composition. If the elastomeric phase content falls below about 0.1% by weight, impact properties decline. The preferred range of elastomeric phase content is from about 1 to about 15% by weight, with the higher amount being used when the rubber is dispersed by mechanical blending. If, as is preferred, the rubber is in the form of an elastomeric polystyrene grafted gel, the lower amounts can be advantageous. In all cases, the preferred amount of elastomeric phase will range between 1.5 and 6% of the total weight of the composition. Although, at higher levels, impact strength is clearly optimized, other properties, such as solvent resistance and appearance of molded parts are affected. Because the grafted rubber particles provide compositions with better impact strengths than those from mechanically blended, i.e., ungrafted particles at the optimum level, 1.5 to 6% by weight, the compositions of this invention containing particulate styrene grafted elastomer gel phase are especially preferred.

The method used to form the polyphenylene ether-polystyrene-rubber compositions of the invention is not critical provided that it permits the maximum mean size of the elastomer particles to be reduced to or maintained at 2 microns and preferably between 0.5 and 2 microns. The preferred method is one in which the polyphenylene ether is mixed with polystyrene and a rubber or with a rubber modified polystyrene using any conventional mixing methods and the composition so formed is molded to any desired shape such as by extrusion, hot molding or the like.

It should, of course, be obvious to those skilled in the art that other additives may be included in the present compositions such as plasticizers, pigments, flame retardant additives, reinforcing agents, such as glass filaments or fibers, stabilizers, and the like.

In addition, it is also within the scope of this invention to add other polymers to the composition, such as polyamides, polyolefins, polystyrene, and the like. It has been found, for example, that compositions of polyphenylene oxide and equal parts of polystyrene and a rubber modified polystyrene, with elastomer particle sizes of from 1 to 2 microns, have the impact strengths comparable to the prior art compositions having the same content of polyphenylene ether, but in which all of the polystyrene resin is rubber modified and has a elastomer particle size of about 4 microns. Such compositions not only are more economical to produce than the prior art compositions but they also have improved surface appearance after injection molding.

DESCRIPTION OF THE PREFERRED EMBODIMENTS

The invention will be further illustrated by the following examples wherein, unless otherwise indicated, all compositions are prepared by passing mixtures of the polyphenylenne ether, the styrene resin and the rubber or the high-impact polystyrene and other ingredients, if present, through a variable pitch, single screw extruder with extrusion temperature maintained between about 450° and 550° F. All parts are by weight. The strands emerging from the extruder are cooled, chopped into pellets, extruded, chopped into pellets and molded into test bars using standard procedures.

EXAMPLE 1

Fifth pounds of the following formulation is blended:

| Material | Parts |
|---|---|
| Poly(2,6-dimethyl-1,4-phenylene)ether[1] | 45 |
| Rubber modified polystyrene[2] | 55 |
| Polyethylene | 1.5 |
| Tridecylphosphite | 0.5 |
| Acrawax | .25 |
| Titanium dioxide | 2 |

[1] General Electric Company, PPO polyphenylene ether, in pellet form.
[2] Foster-Grant, Inc., No. 834 high-impact polystyrene, in pellet form, having a dispersed elastomeric phase with a mean particle size of 1–2 microns and a polybutadiene content of about 9% by weight.

The mixture is extruded in a 2½ inch Prodex extruder. The resultant strands are cooled, chopped into pellets and molded into test specimens. The mean particle size of the elastomeric phase in the composition remains 1–2 microns.

The following physical properties are obtained:

| | |
|---|---|
| Izod impact (ft. lbs./in. notch) | 5.7 |
| Gardner impact (in.-lbs.) | 240 |
| Elongation to failure (%) | 48 |
| Heat distortion temp. (264 psi)° F. | 254 |
| Tensile yield str. (psi) | 9,500 |
| Tensile ultimate str. (psi) | 8,400 |
| 45° Gloss value | 62 |
| Flexural modulus (psi) | 350,200 |
| Flexural strength (psi) | 27,259 |

For purposes of comparison, the procedure of Example 1 is repeated substituting for the Foster-Grant No. 834, Monsanto HT-91 rubber modified high-impact polystyrene having dispersed elastomeric phase with a mean particle size of about 6 microns (range 2–10) and a polybutadiene content of about 9% by weight. The composition contains, after mixing, elastomeric phase with particle size of about 6 microns. The following physical properties are obtained:

| | |
|---|---|
| Izod impact (ft.lbs./in. notch) | 1.8 |
| Gardner impact (in.-lbs.) | 200 |
| Elongation to failure (%) | 51 |
| Heat distortion temp. (264 psi) ° F. | 268 |
| Tensile yield str. (psi) | 9,700 |
| Tensile ultimate str. (psi) | 8,200 |

| | |
|---|---|
| 45° Gloss value | 59 |
| Flexural modulus (psi) | 380,900 |
| Flexural strength (psi) | 30,460 |

A comparison of the results demonstrates a substantial improvement in impact strength as measured in the Izod and Gardner tests as well as surface appearance (as indicated from the gloss value) in the composition which contains particles of 1-2 microns in comparison with that which contains particles of 6 microns in diameter.

EXAMPLE 2

Fifty pounds of the following self-extinguishing formulation is blended:

| Material | Parts |
|---|---|
| Poly(2,6-dimethyl-1,4-phenylene)ether (PPO) | 50 |
| Rubber modified polystyrene (No. 834) | 50 |
| Polyethylene | 1.5 |
| Triphenylphosphate | 3.0 |
| Tridecylphosphite | 1.0 |
| Zinc Sulfide | 1.5 |
| 30% Styrene Master Batch Black | 0.5 |

After extrusion in a 2½ inch Prodex extruder, the strands are cooled, chopped and molded into test bars by conventional procedures. The mean particle size in the elastomeric phase is 1-2. The following physical properties are obtained:

| | |
|---|---|
| Izod impact (ft.lbs./in. notch) | 5.1 |
| Gardner impact (in.-lbs.) | 175 |
| Elongation to failure | 49 |
| Heat distortion temp. (264 psi) °F | 251 |
| Tensile yield str. (psi) | 9,100 |
| Tensile ultimate str. (psi) | 8,200 |
| Flexural modulus (psi) | 341,800 |
| Flexural strength (psi) | 26,015 |

For comparative purposes, the procedure of Example 2 is repeated, substituting for Foster-Grant No. 834, high-impact polystyrene HT-91 having dispersed elastomeric phase with a mean particle size of 6 microns (range 2-10). The final composition has a particle size in the same range. The following physical properties are obtained:

| | |
|---|---|
| Izod impact (ft.lbs./in. notch) | 1.8 |
| Gardner impact (in.-lbs.) | 120 |
| Elongation to failure (%) | 40 |
| Heat distortion temp. (264 psi) °F | 250 |
| Tensile yield str. (psi) | 9,350 |
| Tensile ultimate str. (psi) | 8,300 |
| Flexural modulus (psi) | 339,260 |
| Flexural strength (psi) | 30,860 |

A comparison of the results demonstrates a substantial improvement in impact strength in compositions containing dispersed elastomer having particles with a maximum diameter of 2 microns.

EXAMPLE 3

Fifty pounds of the following self-extinguishing formulation is blended:

| Material | Parts |
|---|---|
| Polyphenylene ether (PPO) | 40 |
| High impact polystyrene (No. 834) | 60 |
| Polyethylene | 1.5 |
| Tridecylphosphite | 0.5 |
| Triphenylphosphate | 9 |
| Teflon | 0.1 |

After extrusion in a 2½ inch Prodex extruder, the strands are cooled, chopped and molded into test specimens by conventional procedures. The mean particle size in the elastomeric phase is 1-2 microns. The following physical properties are obtained:

| | |
|---|---|
| Izod impact (ft.lbs./in. notch) | 5.3 |
| Gardner impact (in.-lbs.) | >240 |
| Elongation to failure (%) | 55 |
| Heat distortion temp. (264 psi) °F | 219 |
| Tensile yield str. (psi) | 8,000 |
| Tensile ultimate str. (psi) | 7,420 |
| 45° Gloss value | 61.5 |

For comparative purposes the procedure of Example 3 is repeated, substituting for the Foster Grant No. 834, Monsanto HT-91 high-impact polystyrene having a mean particle size of 6 microns (range 2-10 microns). The final composition has a particle size in this range. The following physical properties are obtained:

| | |
|---|---|
| Izod impact (ft.lbs./in. notch) | 1.8 |
| Gardner impact (in.-lbs.) | 50 |
| Elongation to failure (%) | 42 |
| Heat distortion temp. (264 psi) °F | 210 |
| Tensile yield str. (psi) | 8,600 |
| Tensile ultimate str. (psi) | 7,200 |

A comparison of the results demonstrates a substantial improvement in impact strength in such compositions containing dispersed elastomer having particles with a maximum diameter of 2 microns.

EXAMPLE 4

Fifty pounds of the following formulation is blended:

| Material | Parts |
|---|---|
| Polyphenylene ether (PPO) | 30 |
| High-impact polystyrene (No. 834) | 70 |
| Polyethylene | 1.5 |
| Tridecylphosphite | 0.5 |
| Triphenylphosphate | 6 |

After extrusion in a 2½ inch Prodex extruder, the strands are cooled, chopped into pellets and molded into test specimens by conventional techniques. This composition, which contains about 68% by weight of styrene resin (rubber-free basis) based on combined styrene resin, rubber-free, and polyphenylene ether and about 5.8% of dispersed elastomeric phase of 1-2 microns particulate diameter, has a higher impact strength (4.9 vs. 1.7) than that reported for similar compositions in the prior art, made from rubber modified polystyrene in which the particle size is from 2-10 microns (Cizek, U.S. Pat. No. 3,383,435). The following physical properties are obtained:

| | |
|---|---|
| Izod impact (ft.lbs./in. notch) | 4.9 |
| Heat distortion temp. (264 psi) °F | 227 |
| Elongation to failure (%) | 44 |

| | |
|---|---|
| -continued | |
| Tensile yield str. (psi) | 7,500 |

EXAMPLE 5

Fifty pounds of the following formulation are blended:

| Material | Parts |
|---|---|
| Polyphenylene ether (PPO) | 25 |
| High-impact polystyrene (No. 834) | 75 |
| Polyethylene | 1.5 |
| Tridecylphosphite | 0.5 |
| Triphenylphosphate | 6 |

After extrusion in a 2½ inch Prodex extruder, the strands are cooled, chopped into pellets and molded into test specimens. The dispersed particles of elastomeric phase average between 1 and 2 microns in diameter. The following physical properties are obtained:

| | |
|---|---|
| Izod impact (ft.lbs./in. notch) | 4.0 |
| Elongation to failure (%) | 34 |
| Heat distortion temp. (264 psi) ° F | 223 |
| Tensile yield str. (psi) | 7,500 |
| Tensile ultimate str. (psi) | 7,200 |

A similar composition from the prior art, but in which Monsanto HT-88 high-impact polystyrene was used, with particle size of 2-10 microns (Cizek, U.S. Pat. No. 3,383,435, Example 7 and FIG. 18) had an impact strength of only about 1.7 ft.lbs./in. notch.

Test bars prepared from the formulations of Examples 1 and 2 immersed in gasoline at 1% strain did not undergo catastrophic failure after 15 minutes when the particle size averaged from 1 to 2 microns (Foster Grant No. 834). By comparison, test bars prepared from the formulations wherein the particle sizes were larger (Monsanto HT-91) all failed (catastrophic failure) in less than 15 seconds at 1% strain in gasoline.

EXAMPLE 6

A composition is prepared containing 50 parts of poly(2,6-dimethyl-1,4-phenylene)ether, 45 parts of crystal polystyrene and 5 parts of polybutadiene rubber. First the rubber and the crystal polystyrene are intensively mixed in a Banbury mixer until the rubber particles are reduced to an average diameter of 1 to 2 microns, then the mixture is co-extruded with the polyphenylene ether and a uniformly mixed composition is obtained with the elastomeric particle size ranging from 1 to 2 microns. This composition, after cooling, chopping into pellets and molding into test specimens provides articles with high impact strength and improved gloss.

EXAMPLE 7

The procedure of Example 1 is repeated, substituting for the polystyrene modified with polybutadiene, a polystyrene containing 9% by weight of elastomeric phase derived from a rubbery styrene butadiene copolymer containing 77% of butadiene units and 23% of styrene units, by weight. The final composition has a particle size of between 0.5 and 2 microns and the impact strength is high and comparable to that shown in Example 1.

EXAMPLE 8

Three formulations are prepared by blending the following:

| Materials | Parts | | |
|---|---|---|---|
| Formulation | A | B | C |
| Poly(2,6-dimethyl-1,4-phenylene)ether (PPO) | 40 | 40 | 40 |
| Rubber modified polystyrene | | | |
| (Cosden, 825 TV, 3-8 microns) | 65 | — | — |
| (Koppers, Dylene 601, 3-10 microns) | — | 65 | — |
| (Koppers, PRX 1005, 1-2 microns) | — | — | 65 |

In each of the polystyrenes, the rubber contents were 7.5% by weight.

All three compositions are extruded through a ¾ inch Wayne extruder and molded in a 3 oz. Newbury molding machine. The respective compositions contain dispersed elastomeric gel of particulate diameter corresponding to that in the rubber modified styrene resin. The properties are as follows:

| Formulation | A | B | C |
|---|---|---|---|
| Izod impact (ft.lbs./in. notch) | 1.70 | 1.84 | 3.82 |
| Tensile yield strength (psi) | 9,600 | 9,000 | 9,100 |
| Tensile strength (psi) | 7,800 | 7,600 | 7,400 |
| Elongation (%) | 36 | 46 | 47 |

Composition C is seen to have an impact strength far in excess of A or B. These results demonstrate that such properties are obtainable at the same rubber level, by using elastomer particles with a size of 1-2 microns instead of the 3-10 micron range found commonly in commercially available rubber modified polystyrenes and used previously in polyphenylene ether compositions of the prior art.

EXAMPLE 9

A composition is prepared by the procedure of Example 1, except that one-half of the Foster Grant No. 834 rubber modified high-impact polystyrene is replaced by crystal polystyrene (Monsanto HH-101). The formulations are as follows:

| | Parts | | |
|---|---|---|---|
| Material | D | E | F |
| Poly(2,6-dimethyl-1,4-phenylene)ether (PPO) | 45 | 45 | 45 |
| Rubber modified polystyrene | | | |
| (Foster Grant, No. 834, 1-2 microns) | 55 | — | 27.5 |
| (Monsanto HT-91, 2-10 microns) | — | 55 | — |
| Crystal Polystyrene (Monsanto, HH-101) | — | — | 27.5 |
| Polyethylene | 1.5 | 1.5 | 1.5 |
| Tridecylphosphite | 0.5 | 0.5 | 0.5 |
| Acrawax | 0.25 | 0.25 | 0.25 |
| Titanium dioxide | 2 | 2 | 2 |

After extruding, the compositions contain dispersed elastomer particles of the same diameter as present in the starting materials. Test pieces molded from the respective compositions have the following properties:

| Formulation | D | E | F |
|---|---|---|---|
| Izod impact (ft. lbs./in. notch) | 5.7 | 1.8 | 1.7 |

-continued

| Formulation | D | E | F |
|---|---|---|---|
| Melt Viscosity (poise) | 2,540 | 2,600 | 2,350 |
| Elongation (%) | 48 | 51 | 59 |
| Heat Distortion Temp. | 254 | 268 | 280 |

It is seen that blending the No. 834 material with 1-2 micron particles with a substantial portion of rubber-free styrene resin provided Composition F, much reduced in cost, but retaining the impact properties of the Composition B which had twice the rubber content of Composition F. It is noteworthy that the heat distortion temperature of F is better than E.

EXAMPLE 11

The following polyphenylene ethers are substituted for poly(2,6-dimethyl-1,4-phenylene)ether in the formulation of Example 1 poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

The final compositions have properties similar to those exhibited by the composition of Example 1.

EXAMPLE 12

The following polystyrene resins are substituted for the crystal homopolystyrene in the formulation of Example 6:

poly-α-methylstyrene;
styrene-acrylonitrile copolymer (27% ACN);
styrene-α-methylstyrene copolymer;
styrene-methyl methacrylate copolymer;
poly-α-chlorostyrene; and
styrene-acrylonitrile-α-methylstyrene terpolymer.

The final compositions have properties similar to those of the composition of Example 6.

The following rubbers are substituted for the polybutadiene in the formulation of Example 6;

natural crepe rubber;
styrene-butadiene copolymer rubber (23.5% STY);
acrylonitrile-butadidne copolymer rubber (18% ACN);
methyl isopropenyl ketone-butadiene copolymer rubber (50% MIK); and
ethylene-propylene-butadiene terpolymer rubber.

The final compositions have properties similar to those of the composition of Example 6.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A high impact thermoplastic composition comprising from 1 to 99% by weight of a polyphenylene ether having the repeating structural formula:

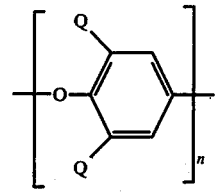

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, from 99 to 1% of a polystyrene resin, on a rubber-free basis, and from 0.1 to 30% by weight of the total weight of the composition of a rubber, said composition having a dispersed particulate rubber phase in which the particles have a maximum mean diameter of about 2 microns.

2. A composition as defined in claim 1 wherein said particles have a mean diameter of from about 0.5 to about 2 microns.

3. A high impact strength thermoplastic composition comprising from 1 to 99% by weight of a polyphenylene ether having the repeating structural formula:

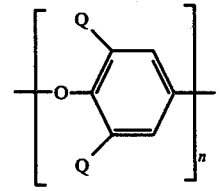

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus and (a) a polystyrene resin and a rubber;
(b) a rubber modified polystyrene resin; or
(c) a mixture of (a) and (b), said polystyrene resin comprising from 99 to 1%, on a rubber-free basis, the composition having a dispersed particulate elastomeric phase in which the particles have a maximum mean diameter of about 2 microns and wherein the elastomeric phase comprises from 0.1 to 30% of the total weight of said composition.

4. A composition as defined in claim 3 wherein the mean diameter of the dispersed elastomeric particles is from about 0.5 microns to about 2 microns.

5. A composition as defined in claim 3 wherein said polystyrene resin, on a rubber-free basis, comprises from 20 to 80% by weight of the combined weight of said polystyrene resin, on a rubber-free basis, and said polyphenylene ether.

6. A composition as defined in claim 5 wherein said polystyrene resin, on a rubber-free basis, comprises from 40 to 60% by weight of the combined weight of said polystyrene resin, on a rubber-free basis, and said polyphenylene ether.

7. A composition as defined in claim 3 wherein the elastomeric phase comprises from 1 to 15% of the total weight of said composition.

8. A composition as defined in claim 7 wherein the elastomeric phase comprises from 1.5 to 6% of the total weight of said composition.

9. A composition as defined in claim 3 comprising polyphenylene oxide, a polystyrene resin and a rubber, and wherein said elastomeric phase comprises particles of rubber.

10. A composition as defined in claim 3 comprising a polyphenylene ether and a rubber modified polystyrene, and wherein said elastomeric phase comprises particles of a polystyrene grafted elastomeric gel.

11. A composition as defined in claim 10 wherein said rubber modified polystyrene comprises from 70–99 parts by weight of polystyrene and 1–30 parts by weight of a particulate diene elastomer-styrene graft copolymer gel phase.

12. A composition as defined in claim 11 wherein the mean particulate diameter of said graft copolymer gel phase is from about 0.5 microns to about 2 microns.

13. A composition as defined in claim 11 wherein the elastomeric phase comprises from 1.5 to 6% of the total weight of said composition.

14. A composition as defined in claim 11 wherein the diene elastomer is polybutadiene.

15. A composition as defined in claim 14 wherein the elastomeric phase comprises from 1.5 to 6% of the total weight of said composition.

16. A composition as defined in claim 11 wherein the diene elastomer is a styrene-butadiene copolymer.

17. A composition defined in claim 16 wherein the elastomeric phase comprises from 1.5 to 6% of the total weight of said composition.

18. A composition as defined in claim 3 wherein Q is alkyl having from 1 to 4 carbon atoms.

19. A composition as defined in claim 18 wherein Q is methyl.

* * * * *

UNITED STATES PATENT AND TRADEMARK OFFICE
CERTIFICATE OF CORRECTION

PATENT NO. : 4,128,602
DATED : December 5, 1978
INVENTOR(S) : Arthur Katchman and Gim F. Lee, Jr.

It is certified that error appears in the above-identified patent and that said Letters Patent are hereby corrected as shown below:

Column 2, line 4, "the" is misspelled.

Column 2, line 14, "the" is misspelled.

Column 2, line 33, "pages" should be --page--.

Column 5, line 54, "neutral" should be --natural--.

Column 6, line 11, "rubber" should be --rubbery--.

Column 8, line 19, delete "extruded, chopped into pellets".

Column 8, line 23, "Fifth" should be --Fifty--.

Column 9, line 34, after "failure" insert --(%)--.

Column 13, line 51, "butadiene" is misspelled.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks

REEXAMINATION CERTIFICATE (385th)
United States Patent [19]

Katchman et al.

[11] B1 4,128,602

[45] Certificate Issued Sep. 10, 1985

[54] POLYPHENYLENE ETHER COMPOSITIONS CONTAINING RUBBER MODIFIED POLYSTYRENE

[75] Inventors: Arthur Katchman, Delmar; Gim F. Lee, Jr., Albany, both of N.Y.

[73] Assignee: General Electric Company, Pittsfield, Mass.

Reexamination Request:
No. 90/000,484, Dec. 15, 1983

Reexamination Certificate for:
Patent No.: 4,128,602
Issued: Dec. 5, 1978
Appl. No.: 809,440
Filed: Jun. 23, 1977

Related U.S. Application Data

[63] Continuation of Ser. No. 489,510, Jul. 18, 1974, abandoned, which is a continuation-in-part of Ser. No. 122,079, Mar. 8, 1971, abandoned, which is a continuation-in-part of Ser. No. 31,793, Apr. 24, 1970, abandoned.

[51] Int. Cl.³ .................... C08L 51/04; C08L 25/04; C08L 71/04
[52] U.S. Cl. ..................... 525/68; 525/133; 525/132; 525/905
[58] Field of Search ................. 525/68, 133

[56] References Cited

U.S. PATENT DOCUMENTS

| | | | |
|---|---|---|---|
| 3,383,435 | 5/1968 | Cizek | 260/874 |
| 3,639,508 | 2/1972 | Kambour | 260/876 B |
| 3,660,531 | 5/1972 | Lauchlan et al. | 260/876 B |

OTHER PUBLICATIONS

Kirk–Othmer's "Encyclopedia of Chemical Technology", 2nd Edition, vol. 19, pp. 85–134, (1969).
*Applied Polymer Symposia*, 15, pp. 51–78, (1970).
*Journal of Applied Polymer Science*, 15, pp. 357–367, (1971).
*Encyclopedia of Polymer Science and Technology*, vol. 13, pp. 375–425, (1970).

*Primary Examiner*—Wilbert J. Briggs

[57] ABSTRACT

There are provided high impact strength thermoplastic compositions comprising a polyphenylene ether and a polystyrene resin and rubber of a rubber modified polystyrene resin. The compositions include a dispersed elastomeric phase with the dispersed particles having a maximum mean diameter of 2 microns and preferably from about 0.5 to 2 microns. The small elastomeric particles provide molded articles with substantial and unexpected improvements in impact resistance, surface appearance and resistance to aggressive solvent systems in comparison with known compositions having dispersed elastomeric particles of larger than 2 microns in diameter.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-19 are cancelled.

New claims 20-57 are added and determined to be patentable.

20. *A high impact thermoplastic composition comprising from 1 to 99% by weight of a polyphenylene ether having the repeating structural formula:*

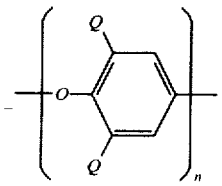

*wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, from 99 to 1% of a polystyrene resin, on a rubber-free basis, and from 0.1 to 30% by weight of the total weight of the composition of a rubber, said composition having a dispersed particulate rubber phase in which the particles have a maximum mean diameter of about 2 microns wherein the maximum mean diameter is determined by optical contrast microscopy.*

21. *The composition of claim 20 wherein said particles have a mean diameter of from 0.5 to about 2 microns.*

22. *A high impact strength thermoplastic composition comprising from 1 to 99% by weight of a polyphenylene ether having the repeating structural formula:*

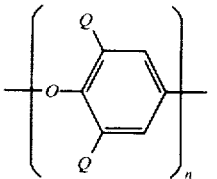

*wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus and*

*(a) a polystyrene resin and a rubber;*
*(b) a rubber modified polystyrene resin; or*
*(c) a mixture of (a) and (b), said polystyrene resin comprising from 99 to 1%, on a rubber-free basis, the composition having a dispersed particulate elastomeric phase in which the particles have a maximum mean diameter of about 2 microns determined by optical contrast microscopy and wherein the elastomeric phase comprises from 0.1 to 30% of the total weight of said composition.*

23. *The composition of claim 22 wherein the mean diameter of the dispersed elastomeric particles is from about 0.5 microns to about 2 microns.*

24. *A composition as defined in claim 22 wherein said polystyrene resin, on a rubber-free basis, comprises about 20 to 80% by weight of the combined weight of said polystyrene resin, on a rubber-free basis, and said polyphenylene ether.*

25. *A composition as defined in claim 24 wherein said polystyrene resin, on a rubber-free basis, comprises from 40 to 60% by weight of the combined weight of said polystyrene resin, on a rubber-free basis, and said polyphenylene ether.*

26. *A composition as defined in claim 22 wherein the elastomeric phase comprises from 1 to 15% of the total weight of said composition.*

27. *A composition as defined in claim 26 wherein the elastomeric phase comprises from 1.5 to 6% of the total weight of said composition.*

28. *A composition as defined in claim 22 comprising polyphenylene oxide, a polystyrene resin and a rubber, and wherein said elastomeric phase comprises particles of rubber.*

29. *A composition as defined in claim 22 comprising a polyphenylene ether and a rubber modified polystyrene, and wherein said elastomeric phase comprises particles of a polystyrene grafted elastomeric gel.*

30. *A composition as defined in claim 29 wherein said rubber modified polystyrene comprises from 70-99 parts by weight of polystyrene and 1-30 parts by weight of a particulate diene elastomer-styrene graft copolymer gel phase.*

31. *A composition as defined in claim 30 wherein the mean particulate diameter of said graft copolymer gel phase is from about 0.5 microns to about 2 microns.*

32. *A composition as defined in claim 30 wherein the elastomeric phase comprises from 1.5 to 6% of the total weight of said composition.*

33. *A composition as defined in claim 30 wherein the diene elastomer is polybutadiene.*

34. *A composition as defined in claim 33 wherein the elastomeric phase comprises from 1.5 to 6% of the total weight of said composition.*

35. *A composition as defined in claim 30 wherein the diene elastomer is a styrene-butadiene copolymer.*

36. *A composition defined in claim 35 wherein the elastomeric phase comprises from 1.5 to 6% of the total weight of said composition.*

37. *A composition as defined in claim 22 wherein Q is alkyl having from 1 to 4 carbon atoms.*

38. *A composition as defined in claim 37 wherein Q is methyl.*

39. The composition of claim 20 wherein the optical contrast microscopy is phase contrast microscopy.

40. The composition of claim 39 wherein said particles have a mean diameter of from 0.5 to about 2 microns.

41. The composition of claim 22 wherein the optical contrast microscopy is phase contrast microscopy.

42. The composition of claim 41 wherein the mean diameter of the dispersed elastomeric particles is from about 0.5 microns to about 2 microns.

43. A composition as defined in claim 41 wherein said polystyrene resin, on a rubber-free basis, comprises from 20 to 80% by weight of the combined weight of said polystyrene resin, on a rubber-free basis, and said polyphenylene ether.

44. A composition as defined in claim 43 wherein said polystyrene resin, on a rubber-free basis, comprises from 40 to 60% by weight of the combined weight of said polystyrene resin, on a rubber-free basis, and said polyphenylene ether.

45. A composition as defined in claim 41 wherein the elastomeric phase comprises from 1 to 15% of the total weight of said composition.

46. A composition as defined in claim 45 wherein the elastomeric phase comprises from 1.5 to 6% of the total weight of said composition.

47. A composition as defined in claim 41 comprising polyphenylene oxide, a polystyrene resin and a rubber, and wherein said elastomeric phase comprises particles of rubber.

48. A composition as defined in claim 41 comprising polyphenylene ether and a rubber modified polystyrene, and wherein said elastomeric phase comprises particles of a polystyrene grafted elastomeric gel.

49. A composition as defined in claim 48 wherein said rubber modified polystyrene comprises from 70–99 parts by weight of polystyrene and 1–30 parts by weight of a particulate diene elastomer-styrene graft copolymer gel phase.

50. A composition as defined in claim 49 wherein the mean particulate diameter of said graft copolymer gel phase is from about 0.5 microns to about 2 microns.

51. A composition as defined in claim 49 wherein the elastomeric phase comprises from 1.5 to 6% of the total weight of said composition.

52. A composition as defined in claim 49 wherein the diene elastomer is polybutadiene.

53. A composition as defined in claim 52 wherein the elastomeric phase comprises from 1.5 to 6% of the total weight of said composition.

54. A composition as defined in claim 49 wherein the diene elastomer is a styrene-butadiene copolymer.

55. A composition defined in claim 54 wherein the elastomeric phase comprises from 1.5 to 6% of the total weight of said composition.

56. A composition as defined in claim 41 wherein Q is alkyl having from 1 to 4 carbon atoms.

57. A composition as defined in claim 56 wherein Q is methyl.

* * * * *